M. PRATT.

Machine for Trimming Keys of Musical-Instruments.

No. 6,455. Reissued May 25, 1875.

Witnesses:
Solon Kemon
Chas. A. Pettit

Inventor:
Milon Pratt
by Munn & Co
Attys

THE GRAPHIC CO. PHOTO-LITH. 39 & 41 PARK PLACE, N.Y.

UNITED STATES PATENT OFFICE.

MILON PRATT, OF DEEP RIVER, CONNECTICUT, ASSIGNOR TO HIMSELF AND PRATT, READ & CO., OF SAME PLACE.

IMPROVEMENT IN MACHINES FOR TRIMMING KEYS OF MUSICAL INSTRUMENTS.

Specification forming part of Letters Patent No. 156,498, dated November 3, 1874; reissue No. 6,455, dated May 25, 1875; application filed March 20, 1875.

*To all whom it may concern:*

Be it known that I, MILON PRATT, of Deep River, in the county of Middlesex and State of Connecticut, have invented a new and useful Improvement in Machines for Trimming Keys for Musical Instruments, of which the following is a specification:

This invention relates to the manufacture of keys for pianos, organs, and similar musical instruments; and consists of a machine for trimming off the wood remaining on the keys after the pieces commonly known as "sharps" are removed.

In the manufacture of keys for musical instruments a flat board of the proper size is first prepared, upon one surface of which the ivory coverings of the intended keys are glued. The spaces between the ivory coverings, where the keys of the sharps are subsequently to stand, are then cut out, and the wood removed. The removal is accomplished by slitting the board with a saw along the sides of the sharp spaces between the ivory, and then cutting the tongue of wood nearly off by means of a chisel, and finally breaking off the tongue. The ragged edge left by this breaking off is then trimmed and chamfered by hand, which is a slow operation, much skill being required, as the edges of the ivory are apt to be injured by unsteadiness on the part of the operator in using the cutting-tool. The object of the within-described mechanism is to effect the above trimming in a more safe, accurate, and rapid manner than it can be done by hand.

So far as I am aware no mechanism for this purpose has ever before been employed.

Figure 1:
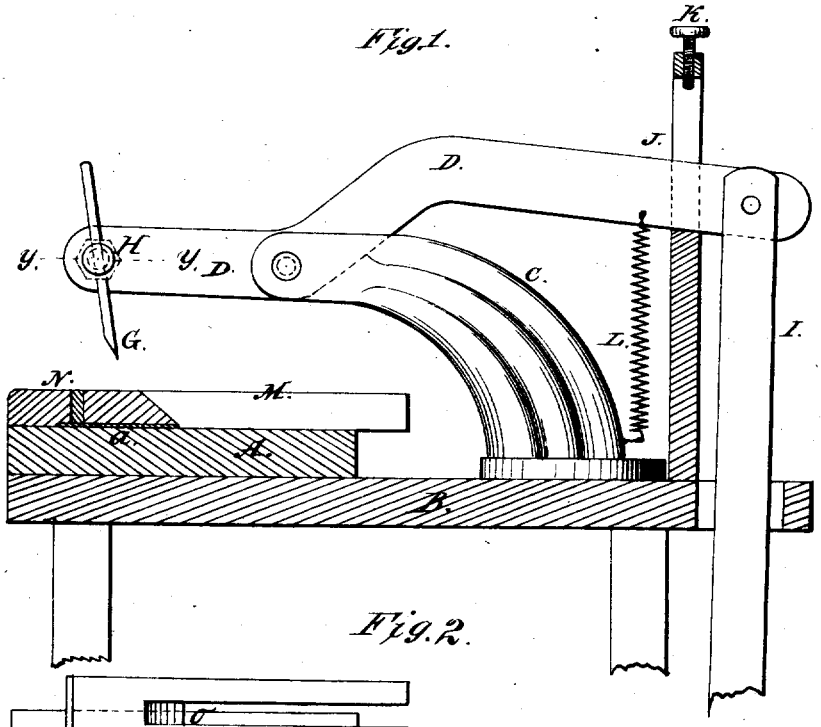
Figure 2:
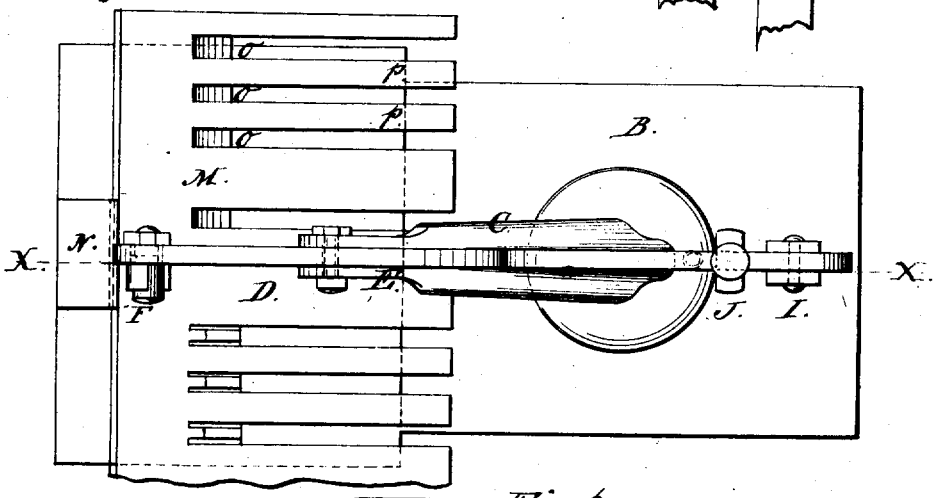
Figure 3:
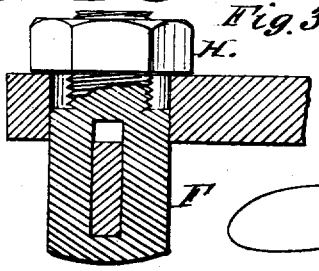

In the accompanying drawing, Figure 1 is a vertical longitudinal section of the machine, taken on the line *x x* of Fig. 2. Fig. 2 is a top or plan view. Fig. 3 is a section of Fig. 1, taken on the line *y y*.

Similar letters of reference indicate corresponding parts.

A is a platform secured to the bed B in any substantial manner, to which bed is securely fastened the slotted post C. D is a lever which has its fulcrum through the slot E of the post C, to the short end of which lever is fixed by means of the transverse slotted holder F, the beveling cutter G. This holder F is round, so that it will turn in the lever to vary the position of the chisel or cutter. It is fastened when properly adjusted by the screw-nut H of the holder. To the long end of the lever is attached the vertical pitman I, which passes down through the bed B. J is a slotted post fixed in the bed, through which the lever passes. K is a screw in the upper end of the post, the end of which reaches down into the slot, and serves as a gage for the lever. The chisel or cutter is raised by means of a spring, L, which is attached to the lever and to the base of the stand C. M is the key-board, which is placed with the ivory next the platform, and with a projecting edge of the ivory in a slot under the guide N, as indicated by dotted lines. The key-board is moved along under the cutter, and the spaces between the keys are cut on a bevel down to the ivory, in the most accurate and expeditious manner. The cutter is actuated by means of a treadle applied to the pitman, or by any other suitable motive power. By means of the gage-screw K, the cutter is made to stop when it cuts through the wood, so that the ivory is not injured. The wood is cut to a true and smooth bevel, as seen in the drawing, leaving the ivory *a* untouched.

Having thus described my invention, I claim as new and desire to secure by Letters Patent—

1. The combination, with platform A and guide N, of a beveling cutter, G, as and for the purpose specified.

2. The lever D fulcrumed in a post, C, holding the cutter G at one end, and connected at the other with a treadle, as and for the purpose set forth.

MILON PRATT.

Witnesses:
FELIX A. DENISON,
GEO. A. READ.